US008503879B2

United States Patent
Xu et al.

(10) Patent No.: US 8,503,879 B2
(45) Date of Patent: Aug. 6, 2013

(54) HYBRID OPTICAL/ELECTRICAL SWITCHING SYSTEM FOR DATA CENTER NETWORKS

(75) Inventors: Lei Xu, Princeton Junction, NJ (US); Yueping Zhang, Princeton, NJ (US); Atul Singh, Princeton, NJ (US); Guofei Jiang, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 315 days.

(21) Appl. No.: 12/911,491

(22) Filed: Oct. 25, 2010

(65) Prior Publication Data
US 2012/0099863 A1 Apr. 26, 2012

(51) Int. Cl.
*H04J 14/00* (2006.01)
(52) U.S. Cl.
USPC .......... 398/49; 398/45; 398/48; 398/50; 398/51; 398/56
(58) Field of Classification Search
USPC ............ 398/45–57, 82–87, 91, 140, 141
See application file for complete search history.

(56) References Cited

U.S. PATENT DOCUMENTS 7,245,829 B1* 7/2007 Sindile ............................ 398/45
2003/0185565 A1* 10/2003 Wang et al. .................... 398/49

OTHER PUBLICATIONS

Helios: A Hybrid Electrical/Optical Switch Architecture for Modular Data Centers, SIGCOMM'10, Aug. 30-Sep. 3, 2010, pp. 339-350.*

M. Al-Fares, A. Loukasass, and A. Vandat, "A Scalable, Commodity Data Center Network architecture," in Proc.ACM SIGCOMM, Aug. 2008, pp. 63-74.
M. Glick, D. G. Andersen, M. Kaminsky, and L. Mummert, "Dynamically Reconfigurable Optical Links for High-Bandwidth Data Center Networks," in Proc. OFC/NFOEC,Mar. 2009.
A. Greenberg, J. R. Hamilton, N. Jain, S. Kandula, C. Kim, P. Lahiri, D. A. Maltz, P. Patel, and S. Sengupta, "VL2: a Scalable and Flexible Data Center Network," in Proc. ACM SIGCOMM, Aug. 2009, pp. 51-62.
C. Guo, G. Lu, D. Li, H. Wu, X. Zhang, Y. Shi, C. Tian, Y. Zhang, and S. Lu, "BCube: a High Performance, Server-Centric Network Architecture for Modular Data Centers," in Proc. ACM SIGCOMM, Aug. 2009, pp. 63-74.
C. Guo, H. Wu, K. Tan, L. Shi, Y. Zhang, and S. Lu, "DCell: A Scalable and Fault-Tolerant Network Structure for Data Centers," in Proc. ACM SIGCOMM, Aug. 2008, pp. 75-86.
S. Kandula, J. Padhye, and P. Bahl, "Flyways to De-Congest Data Center Networks," in Proc. ACM HotNets, Oct. 2009.
D. C. Lee, "100G and DWDM: Application Climate, Network and Service Architecture," in Proc. OFC/NFOEC, Mar. 2008.
R. N. Mysore, A. Pamboris, N. Farrington, N. Huang, P. Miri, S. Radhakrishnan, V. Subramanya, and A. Vahdat, "PortLand: a Scalable Fault-Tolerant Layer 2 Data Center Network Fabric," in Proc. ACM SIGCOMM, Aug. 2009, pp. 39-50.

(Continued)

*Primary Examiner* — Li Liu
(74) *Attorney, Agent, or Firm* — Joseph Kolodka

(57) ABSTRACT

In one aspect, a system includes one or more electrical switches to transfer data in a data network; one or more optical switching groups coupled to each electrical switch, each switching group having one or more server racks, each server rack coupled to a top of rack (TOR) switch and an optical transceiver coupled to the TOR switch; and an optical switching unit (OSU) coupled to the one or more optical switching groups.

13 Claims, 4 Drawing Sheets

OTHER PUBLICATIONS

G. Wang, D. G. Andersen, M. Kaminsky, M. Kozuch, T. S. E. Ng, K. Papagiannaki, M. Glick, and L. Mummert, "Your Data Center Is a Router: The Case for Reconfigurable Optical Circuit Switched Paths," in Proc. ACM HotNets, Oct. 2009.

D. M. Marom, et al., "Wavelength-Selective 1 K Switches Using Free-Space Optics and MEMS Micromirrors: Theory, Design, and Implementation," Journal of Lightwave Tech. 23,1620-1630 (2005).

* cited by examiner

HYBRID OPTICAL/ELECTRICAL SWITCHING SYSTEM FOR DATA CENTER NETWORKS

BACKGROUND

The present invention relates to a hybrid optical/electrical switching for data center networks with an optical switching unit.

Data centers, as the backbone of both conventional (e.g., email, messaging, and banking) and emerging (e.g., cloud) computing services, are facing unprecedented challenges due to the ever-growing scale of applications such as video and large scale data processing. In particular, it has been widely recognized that the conventional tree-like data center network (DCN) suffers poor scalability to both the number of servers and bandwidth demand, as well as several other limitations such as single-point-of-failure, limited sever-to-server capacity, and resource fragmentation.

One approach designs new network interconnection topologies that reorganize servers and switches in certain ways such that improved scalability and bisection bandwidth are achieved. However, the resulting complicated structures of these proposed topologies lead to significantly increased wiring complexity and decreased manageability. Another approach preserves the fundamental interconnection topology and deploys other data transmission technologies, such as high-speed wireless local area network (WLAN) and optical switches. In these approaches, normal workload is still carried by the basic tree-structured network but the peak traffic is offloaded to the extra wireless or optical paths.

FIG. 1 shows an exemplary block diagram of a conventional hybrid electrical/optical switching system with a top of rack (TOR) switch 10. The TOR switch 10 is part of the electrical network, and this network includes an aggregate switch 12 and a core switch 14 that allows one server to communicate with other servers. At the junction between the electrical network and the optical network, one optical transceiver in the TOR switch 10 aggregates the traffic from one or more servers 18. Optical switching is achieved directly through an optical switching matrix 20 with reconfigurable optical paths.

With the system of FIG. 1, servers 18 on one server rack 19 can communicate with other servers 18 on one rack. Due to the dynamic nature of the traffic in data center networks, frequent reconfiguration of the optical switching matrix is expected. However, due to the relatively low switching speed of commercially available optical switching matrix, the optical switching part will suffer from large latency, and may have limited performance in improving the network communication throughput.

SUMMARY

In one aspect, a system includes one or more electrical switches to transfer data in a data center network; one or more optical switching groups coupled to each electrical switch, each switching group having one or more server racks, each server rack coupled to a top of rack (TOR) switch and an optical transceiver coupled to the TOR switch; and an optical switching unit (OSU) coupled to the one or more optical switching groups.

In another aspect, a method to communicate data in a network includes electrically communicating data through one or more electrical switches; optically communicating data over one or more optical switching groups coupled to each electrical switch, each switching group having one or more server racks, each server rack coupled to a top of rack (TOR) switch and an optical transceiver coupled to the TOR switch; and delivering data to a destination using an optical switching unit (OSU) coupled to the one or more optical switching groups.

Advantages of the preferred embodiment may include one or more of the following. The system incorporates multiple optical transceivers with the TOR switch in data center networks. The optical transceivers will run at different wavelengths, and will support data transmission at high bit rate. With the new design, one single server can use one optical transceiver, or multiple servers can share one transceiver at a high aggregated bit rate. In this way, low bit rate transmission can go through the conventional electrical connections, and high bit rate transmission can go through the optical connections to avoid traffic jams or contention in the electrical switches. Further, when increased capacity is needed from the servers, additional high-speed optical transceivers at new wavelengths can be added to the TOR switch and share the same optical fiber, which can avoid replacing old cables or laying new cables. Since one piece of optical fiber can support a relatively large number of wavelengths, multiple racks can share one AWG through channel multiplexing using an optical power coupler.

The system can significantly improve the communication bandwidth of the existing data center networks. Once the optical circuit path is set up, a bit rate transparent communication pipe becomes available. In one embodiment, per channel bit rate in optical fiber communications can be as high as 40 Gb/s or 100 Gb/s, and the total capacity per fiber with DWDM technologies can reach 69 Tb/s. The system is highly scalable and solves a significant challenge facing current data center networks caused by the high complexity of a large number of connecting cables. With the adoption of optical fiber in the preferred embodiment, system upgrade and expansion can be achieved by adding additional wavelengths, instead of coaxial cables or optical fibers.

The system is also fault tolerant: optical switching networks are used to off-load the heavy traffic in data center networks and to provide additional communication channels. As a result, the system improves the fault tolerance of the whole network.

DESCRIPTION

Figure 1:
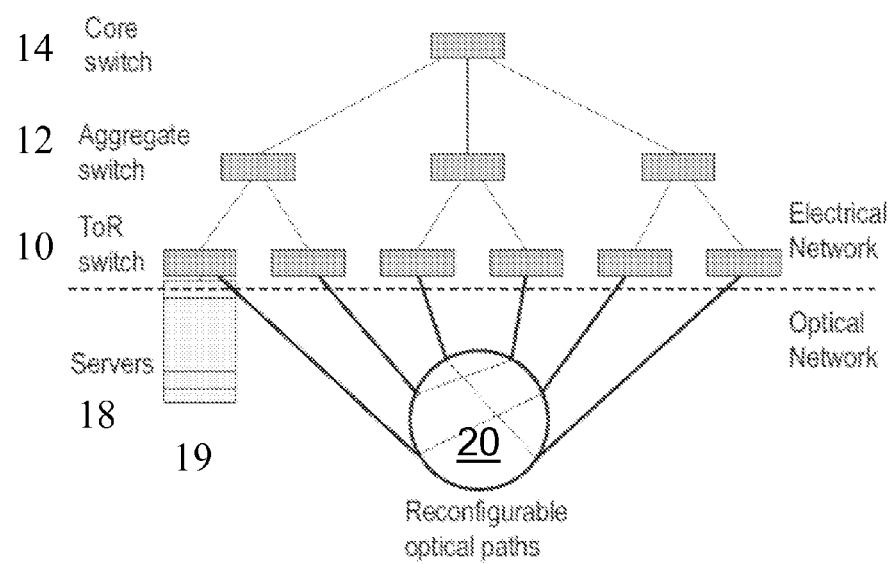
FIG. 1 shows an exemplary block diagram of a conventional hybrid electrical/optical switching system with a top of rack (TOR) switch.
Figure 2:
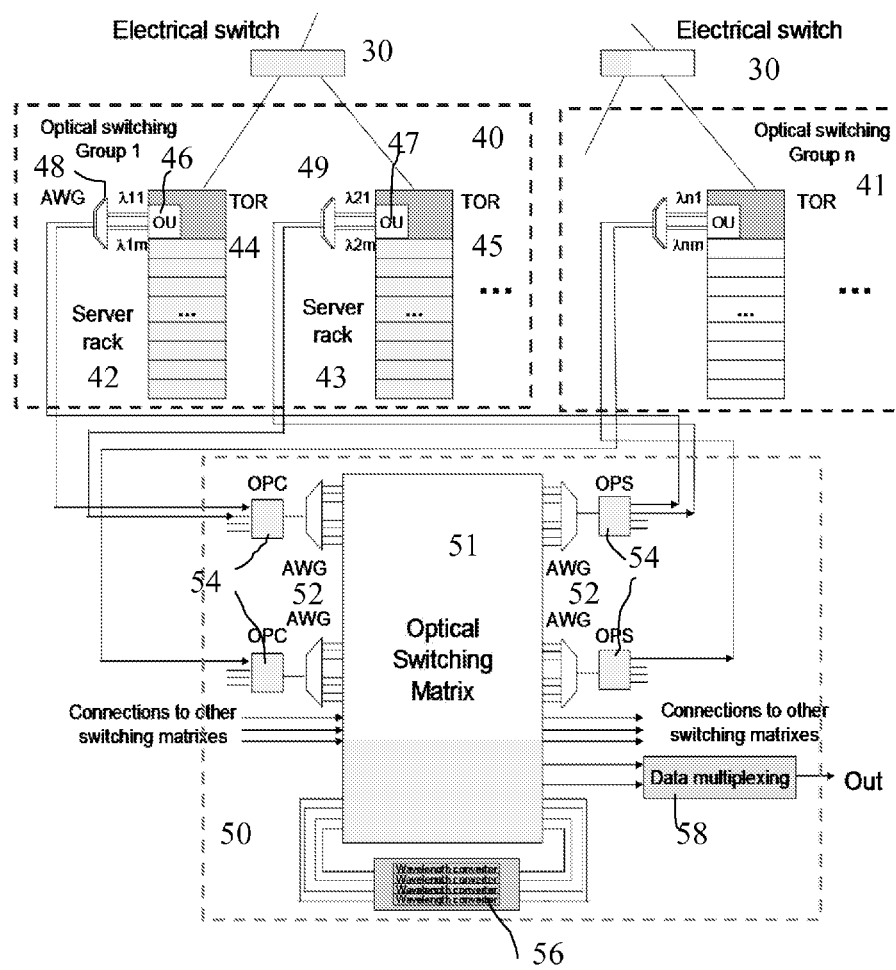
FIG. 2 shows an exemplary hybrid optical/electrical switching system for use in data center networks.

FIG. 2 shows an exemplary hybrid optical/electrical switching system for use in data center networks. The system includes two parts: an electrical portion, and an optical portion. The electrical portion includes equipment already present in a data center network. For example, the data center network can include server racks 42-43, TOR switches 44-45 in a first group 40. The network can have a plurality of groups such as group n 41. Electrical switches 30 connect groups 40-41 to the data center.

The many servers on the same server rack will share a number of optical transceivers 46-47. In one embodiment, the number of servers on one rack can be 40-80, while the optical transceivers can be less than 10. In this way, optical transceivers can operate at a relatively high bit rate for more efficient use of the optical devices.

In group 40, optical transceivers 46-47 are incorporated in TOR switches 44-45 to support high bandwidth connections. Each server rack 42-43 can have m optical transceivers 46-47 at different wavelengths: $\lambda_{11}, \lambda_{12}, \ldots, \lambda_{1m}$, for server rack 42, $\lambda_{21}, \lambda_{22}, \ldots, \lambda_{2m}$, for server rack 43, and $\lambda_{n1}, \lambda_{n2}, \ldots, \lambda_{nm}$, for server rack n. Depending on the available wavelengths or the wavelength assignment design, a predetermined number of racks can be grouped together. In one implementation, optical transceivers 46-47 operate at different wavelengths in each group. In another implementation, one server can be assigned by TOR switches 44-45 to use one optical transceiver, or the traffic from multiple servers is aggregated and shares one optical transceiver. Outputs from the multiple transceivers from one rack or multiple racks can share one channel multiplexer, e.g. arrayed waveguide grating (AWG) 48-49, and the signals in different wavelengths transmit in one piece of optical fiber. For example, one pair of optical channel multiplexers (or AWG) 48 or 49 can service fibers for outgoing and incoming signals. The different racks of servers can be separated into different groups. Within each group, the optical transceivers should be at different wavelengths, and therefore share one optical AWG, which can lower the network cost.

Turning now to the optical portion, the system of FIG. 2 includes one or more optical switching units (OSU) 50. OSU 50 provides optical channel switching and interconnections among the servers. The functional element in the OSU includes an optical circuit switching matrix 51. In one embodiment, the switching matrix 51 is built with MEMS mirrors and can have hundreds of input and output ports. The incoming optical signals from the server racks 42-43 will be first combined by optical power coupler (OPC) 54. Here the optical signals from the same optical switching groups can share one OPC 54. After the OPC 54, AWG 52 will separate the optical signals at different wavelengths to different output ports. If one of the optical receivers on the destination server rack has the same wavelength as the incoming signal, the incoming signal on one side such as the left side of optical switching matrix 51 can be directed to a corresponding port on the right side of optical switching matrix 51, and reach the destination rack after AWG 52 and OPS 54. If none of the optical receivers on the destination server rack matches the wavelength of the incoming signal, the incoming signal on the left is first directed to wavelength converter 56, which can change the wavelength of the incoming signal to match one of the wavelengths of the optical receivers on the destination rack, and then re-directed back to optical switching matrix 51 for signal routing. An optical connection link for two servers within the same rack can be easily set up with OSU 50 through the wavelength conversion. Data multiplexing unit 58 in the OSU 50 supports high-speed data multiplexing, and the multiplexed data can be sent out at the high level to other data center networks.

The system of FIG. 2 uses hybrid electrical and optical switching technologies to enhance the capacity, scalability and fault tolerance of data center networks. Table 1 shows a comparison between typical electronic switching and optical switching systems. Compared with electronic circuit switching, optical circuit switching is transparent to the signal bit rate. Although the hardware cost of optical circuit switching elements is typically high, the cost per bit can be significantly reduced when the total system capacity can be effectively utilized.

TABLE 1

|  | Packet switching | Circuit switching | Bandwidth | Latency | Cost |
| --- | --- | --- | --- | --- | --- |
| Electronics | Yes | Yes | ~Gb/s | ~us | Low |
| Optics | Near term: No (Still in research stage) | Yes | ~100 Gb/s (Potential~1 Tb/s) | >ms | Equipment cost is relatively high. Per bps cost is also low. |

With dense wavelength division multiplexing (DWDM), one single optical fiber can carry multiple communication channels over different wavelengths. The number of wavelengths can be up to 160 or 320 according to the ITU laser wavelength grids for telecommunications. One embodiment uses effective traffic aggregation and management to support high bit rate optical transmission at 10 Gb/s, 40 Gb/s and high per-wavelength-channel with optical switching in DCNs. With DWDM technologies, each optical fiber can be upgraded to carry more channels without requiring cable re-routing or new deployment. In this approach, an optical switching network is overlaid over the existing electrical switching networks to significantly improve the bandwidth demand, scalability and fault-tolerance.

The OSU 50 has full functions to support interconnections of different servers/server racks at the DWDM wavelength level, OSU interconnections, and data multiplexing. For the server interconnections, wavelength conversion may be required.

Figure 3:
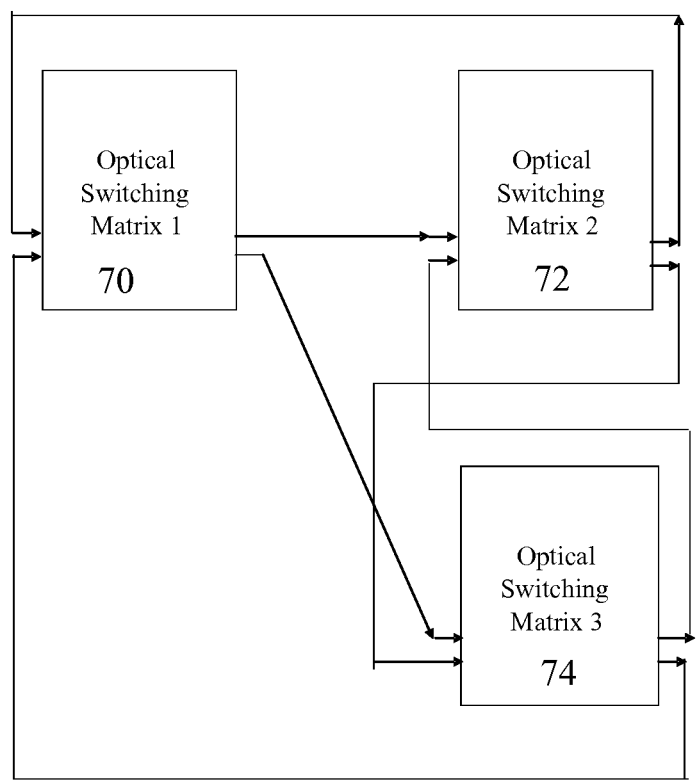
FIG. 3 shows an exemplary OSU interconnect arrangement.

In one embodiment of OSU 50, the same number (N) of the input and the output ports is reserved for OSU interconnect, as shown in FIG. 3. N reserved ports can support N+1 OSU interconnects. In the example of FIG. 3, OSU interconnection through the reserved ports on the optical switching matrices 70, 72 and 74, with N=2. With this interconnection, each of matrices 70-74 can communicate with the remaining two matrices.

Figure 4:
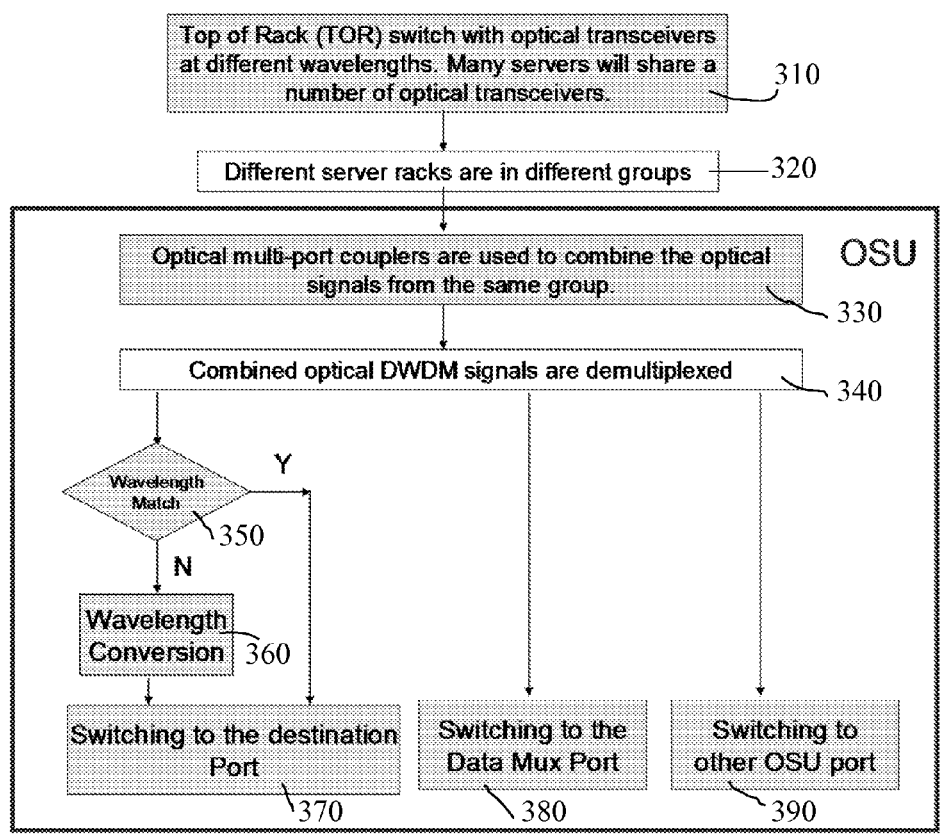
FIG. 4 shows an exemplary process illustrating the operation of the system of FIG. 2.

Referring to FIG. 4, an exemplary process illustrating the operation of the system of FIG. 2 is shown. First, a TOR switch is updated to contain optical transceivers at different wavelengths (310). Servers can share one or more optical transceivers. Next, the server racks are partitioned into different groups (320). At the OSU 50, optical multi-port couplers are provided to combine optical signals from the same group (330) and the combined signals are transmitted over the network. At the receiving end, the combined DWDM signals are demultiplexed (340). At the destination, the wavelength is compared (350). If there is no match, the system performs a wavelength conversion (360) and the system switches the signal to the destination port (370). Alternatively, if a match occurs, the system switches the signal to the destination port (370). Concurrently, the demultiplexed signals are provided to the data multiplexer port (380) and to other OSU ports (390).

The use of multiple optical transceivers with the TOR switch in data center networks improves performance. The optical transceivers will run at different wavelengths, and will support data transmission at high bit rate. With the system, one single server can use one optical transceiver, or multiple servers can share one transceiver at a high aggregated bit rate. In this way, low bit rate transmission can go through the conventional electrical connections, and high bit rate transmission can go through the optical connections to avoid traffic jams or contention in the electrical switches. Further, when increased capacity is needed from the servers, additional high-speed optical transceivers at new wavelengths can be added to the TOR switch and share the same optical fiber, which can avoid replacing old cables or laying new cables. Since one piece of optical fiber can support a relatively large number of wavelengths, multiple racks can share one AWG through channel multiplexing using an optical power coupler.

The optical switching unit is a fully functional sub-system to support multiple operations required by data center networks at great flexibility. The incoming optical signals can be directed to the destination racks directly if the wavelength of the incoming signal matches one of the wavelengths of the optical transceivers on the destination rack. Otherwise optical wavelength conversion can be used. The OSU supports full system upgrade and interconnections with other OSU to scale up the data center networks. The OSU supports high-speed data multiplexing and can send the multiplexed data directly to the upper connection level in data center networks.

The system can significantly improve the communication bandwidth of the existing data center networks. Once the optical circuit path is set up, a bit rate transparent communication pipe becomes available. In one embodiment, per channel bit rate in optical fiber communications can be as high as 40 Gb/s or 100 Gb/s, and the total capacity per fiber with DWDM technologies can reach 69 Tb/s. The system is highly scalable and solves a significant challenge facing current data center networks caused by the high complexity of a large number of connecting cables. With the adoption of optical fiber in the preferred embodiment, system upgrade and expansion can be achieved by adding additional wavelengths, instead of coaxial cables or optical fibers.

The system is also fault tolerant: optical switching networks are used to off-load the heavy traffic in data center networks and to provide additional communication channels. As a result, the system improves the fault tolerance of the whole network.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a digital receiver is discussed next. The digital receiver is essentially a computer with transceivers that can be wired or wireless. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system, comprising:
   a. one or more electrical switches to transfer data in a data center network;
   b. one or more optical switching groups coupled to each electrical switch, each switching group having one or more server racks, each server rack coupled to a top of rack (TOR) switch and an optical transceiver coupled to the TOR switch;
   c. an optical switching unit (OSU) coupled to the one or more optical switching groups;
   d. an optical power coupler (OPC) coupled to the optical transceiver to receive incoming optical signals from the server racks;
   e. an arrayed waveguide grating (AWG) coupled to the OPC to separate optical signals at different wavelengths to different output ports; and
   f. a wavelength converter coupled to the OSU,
      wherein the OSU comprises an optical switching matrix,
      wherein the OSU directs an incoming signal on a predetermined wavelength to a corresponding optical receiver that communicates on the predetermined wavelength, and
      wherein if no optical receiver on a destination server rack matches the predetermined wavelength of the incoming signal, the predetermined wavelength of the incoming signal is changed to match one of the wavelengths of the optical receivers on the destination rack, and redirected back to the optical switching matrix for signal routing.

2. The system of claim 1, comprising a channel multiplexer coupled to the optical transceiver.

3. The system of claim 2, wherein the channel multiplexer comprises an arrayed waveguide grating (AWG).

4. The system of claim 1, comprising a plurality of optical transceivers each transmitting at a different wavelength.

5. The system of claim 4, wherein signals on different wavelengths are transmitted using one optical fiber.

6. The system of claim 5, wherein outputs from the transceivers from one rack or multiple racks share one channel multiplexer.

7. The system of claim 1, wherein a server is assigned by the TOR switch to use one optical transceiver.

8. The system of claim 1, wherein data traffic from multiple servers is aggregated and shared on one optical transceiver.

9. The system of claim 1, wherein the OSU comprises MEMS mirrors with a plurality of input and output ports.

10. The system of claim 1, wherein optical signals from one optical switching group shares one OPC.

11. The system of claim 1, wherein the same number (N) of the input and the output ports is reserved for OSU interconnection.

12. A method to communicate data in a network, comprising:
   a. electrically communicating data through one or more electrical switches;
   b. optically communicating data over one or more optical switching groups coupled to each electrical switch, each switching group having one or more server racks, each server rack coupled to a top of rack (TOR) switch and an optical transceiver coupled to the TOR switch;
   c. delivering data to a destination using an optical switching unit (OSU) coupled to the one or more optical switching groups; and
   d. receiving incoming optical signals from the server racks using an optical power coupler (OPC) coupled to the optical transceiver;
   e. separating optical signals at different wavelengths to different output ports using an arrayed waveguide grating (AWG) coupled to the OPC; and
   f. changing the predetermined wavelength of the incoming signal to match one of the wavelengths of the optical receivers on a destination rack if no optical receiver on the destination server rack matches the predetermined wavelength of the incoming signal, and re-directing the incoming signal back to the optical switching matrix for signal routing, wherein the OSU comprises an optical switching matrix, wherein the OSU directs an incoming signal on a predetermined wavelength to a corresponding optical receiver that communicates on the predetermined wavelength.

13. The method of claim 12, comprising multiplexing data with an arrayed waveguide grating (AWG) and transmitting different wavelengths using one optical fiber, wherein data traffic from multiple servers is aggregated and shared on one optical transceiver.

* * * * *